MARY J. McCOLL.
Manufacture of Sheet-Wax for Flowers.

No. 160,608. Patented March 9, 1875.

WITNESSES:

INVENTOR:
Mary Jane McColl
BY
ATTORNEYS.

UNITED STATES PATENT OFFICE.

MARY JANE McCOLL, OF HOHOKUS, NEW JERSEY.

IMPROVEMENT IN THE MANUFACTURE OF SHEET-WAX FOR FLOWERS.

Specification forming part of Letters Patent No. 160,698, dated March 9, 1875; application filed January 4, 1875.

*To all whom it may concern:*

Figure 1:
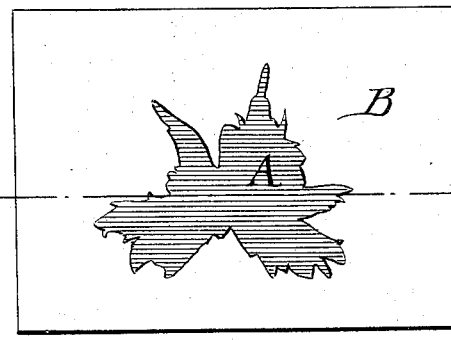
Figure 2:
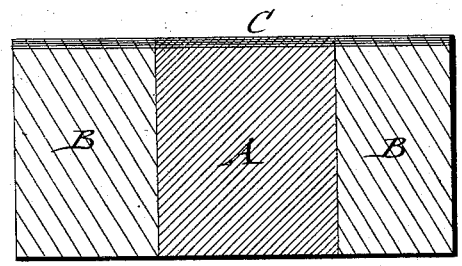
Figure 3:
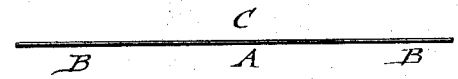

Be it known that I, Mrs. MARY J. McCOLL, of Hohokus, in the county of Bergen and State of New Jersey, have invented a new and useful Improvement in Manufacture of Sheet-Wax for Variegated Leaves, of which the following is a specification:

In the accompanying drawing, Figure 1 represents a top view of a cake of wax with differently-colored leaf embodied therein, for cutting off the sheets therefrom; Fig. 2, a vertical longitudinal section of the same, on the line c c, Fig. 1; and Fig. 3, a vertical longitudinal section of the leaf cut off from the cake.

Similar letters of reference indicate corresponding parts.

My invention relates to a new and improved article of manufacture and method for producing the same, to be used in the making of wax flowers, by which the effects of the same may not only be considerably increased, but also the production of the same greatly facilitated and enlarged.

The invention consists in preparing sheet-wax with patterns of different colors embedded at uniform thickness therein, for producing any kind of leaf, whether domestic or exotic, for use in making wax flowers.

Hitherto all the leaves with variegated colors, such as geranium, exotic leaves, and others, were produced by forming them of sheet-wax of uniform color, and finishing them by painting thereon oil or other suitable colors. This process was connected with considerable difficulties in most cases, as it enabled only those with considerable skill and experience to produce the more complicated leaves with the finished appearance and softness sought for in this art.

I employ for the purpose of forming wax flowers and leaves sheets of wax, which are prepared by cutting out of a cake of wax of suitable color the parts or grounding of the leaf to be produced—as, for instance, in the case of a geranium leaf, from a cake of green wax, the shape of the dark-green part of the leaf, and introduce this leaf-shaped piece A into a cake of wax, B, having the color of the surrounding part or fringe of the leaf, which cake has previously been heated to such a temperature that it is near the melting-point, and of such a degree of softness that the differently-colored cake-leaf may readily sink therein, and be fully surrounded or embedded by the heated wax. The whole is then allowed to cool off, when the cake is cut into the sheets C, in the usual manner, said sheets exhibiting, at uniform thickness, the various differently-colored leaf-patterns or imitations embodied therein. These sheets are lined or backed by a sheet of wax, to give the required degree of strength, and are thus supplied to the trade.

The leaves formed therefrom require but little additional shading with colors, or "retouching," and give a beautiful transparency of color, which increases the effect and heightens the resemblance to the natural leaves.

Any leaf may thus be readily imitated, and thereby the art of making wax flowers be considerably extended to a class of flowers and leaves which were hitherto considered not within the reach of the same.

Having thus described my invention, what I claim as new, and desire to secure by Letters Patent, is—

1. The process herein described of producing, for the manufacture of artificial flowers, sheet-wax with different patterns of leaves or other designs, of uniform thickness with the surrounding parts, consisting, essentially, in first cutting out the patterns or leaves from cakes of wax of suitable colors, embedding the same into heated cakes of different colors, and then cutting the combined cakes so formed, when cool, into thin sheets, substantially as and for the purpose described.

2. As a new article of manufacture, sheet-wax having embodied therein wax-patterns of leaves or other designs, differing in color from the surrounding parts or body, but of uniform thickness with the same, substantially as and for the purpose set forth.

3. Sheet-wax provided with wax-patterns of leaves or other designs, as hereinbefore described and claimed, and having an additional backing or lining of sheet-wax, substantially as set forth.

MARY JANE McCOLL.

Witnesses:
 J. A. McCOLL,
 CHARLES EDGAR MILLS.